No. 714,353. Patented Nov. 25, 1902.
C. A. ANDERSON, E. A. ERICKSON & J. WICKSTROM.
COMBINATION HOT AIR AND GAS ENGINE.
(Application filed Dec. 18, 1901.)
(No Model.) 3 Sheets—Sheet 2.
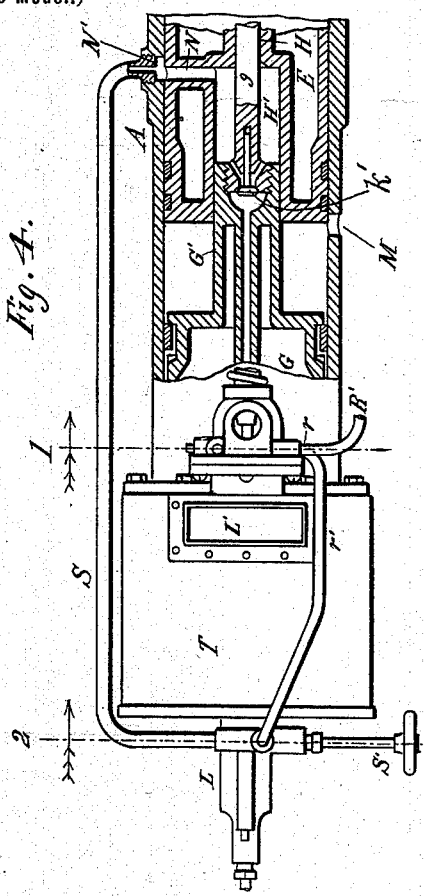
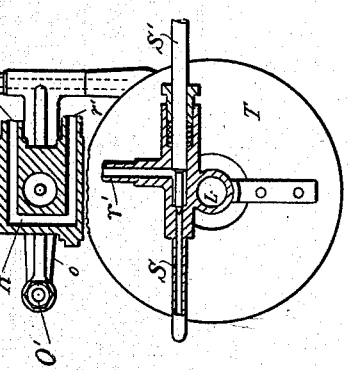
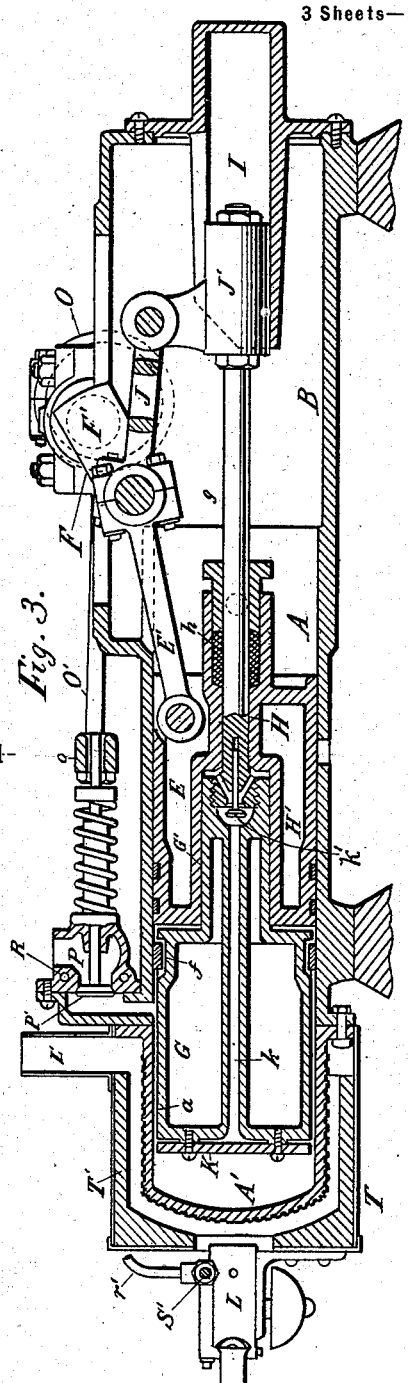
Witnesses
Inventors No. 714,353. Patented Nov. 25, 1902.
C. A. ANDERSON, E. A. ERICKSON & J. WICKSTROM.
COMBINATION HOT AIR AND GAS ENGINE.
(Application filed Dec. 18, 1901.)
(No Model.) 3 Sheets—Sheet 3.
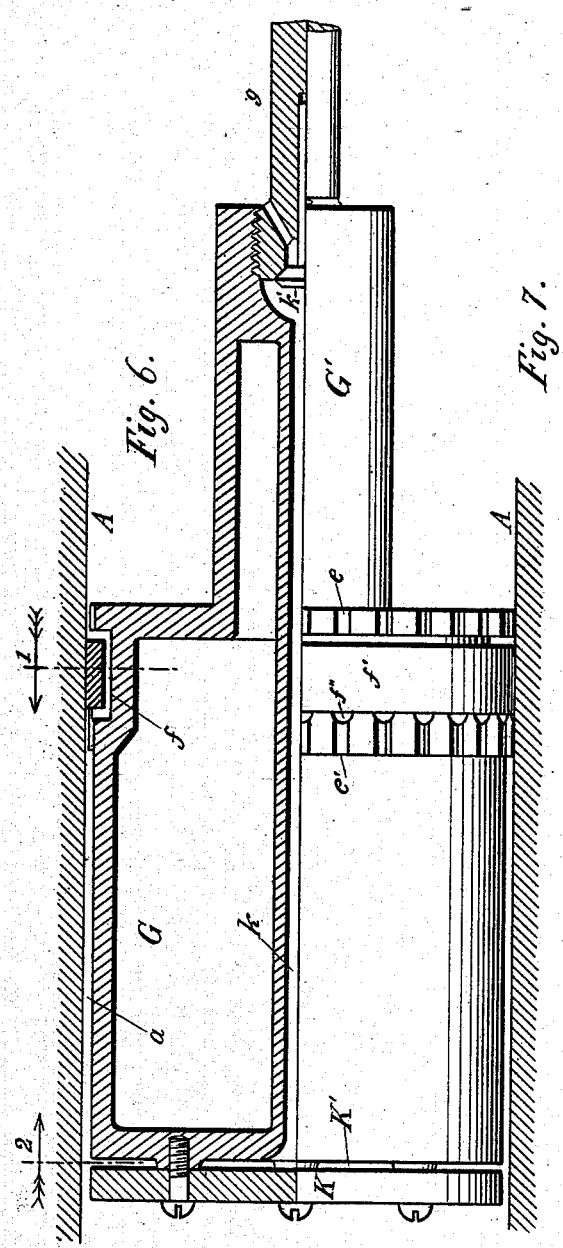
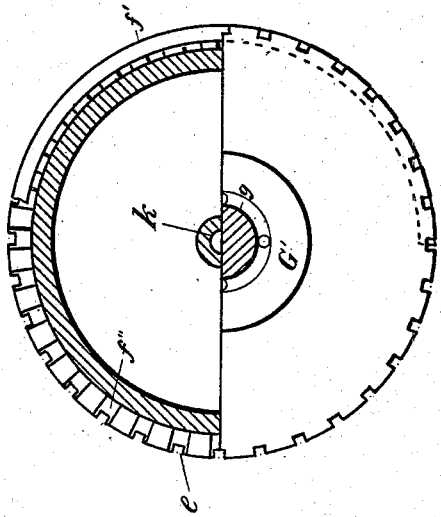
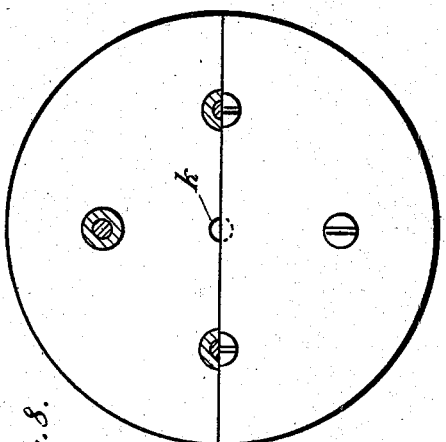
Witnesses
Wm A. Nugent
J. S. Sawrent
Inventors
Chas. A. Anderson
Erick A. Erickson
John Wickstrom
THE NORRIS PETERS CO., PHOTO-LITHO., WASHINGTON, D. C.

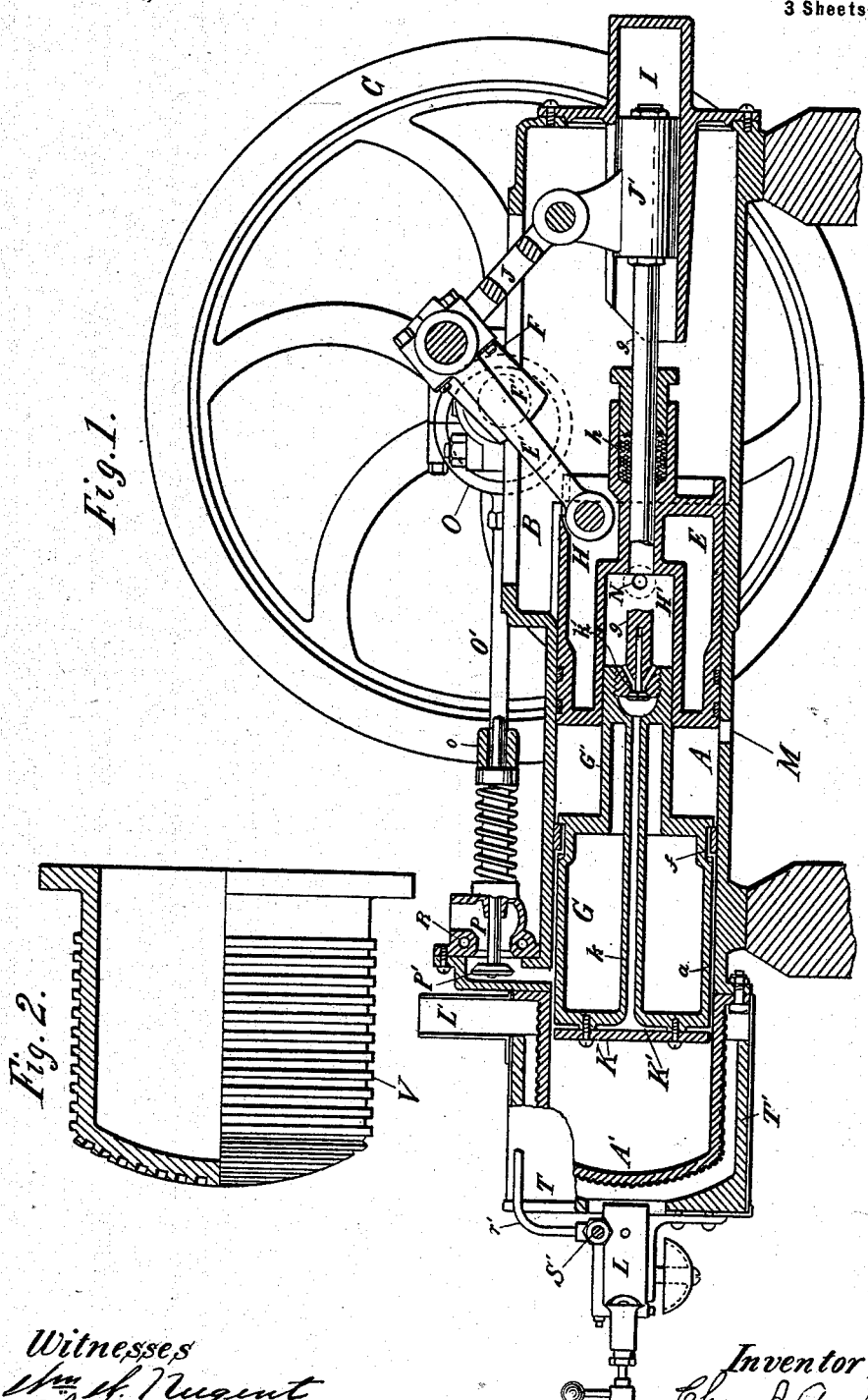

UNITED STATES PATENT OFFICE.

CHARLES A. ANDERSON, ERICK A. ERICKSON, AND JOHN WICKSTROM, OF CHICAGO, ILLINOIS, ASSIGNORS TO CHICAGO MOTOCYCLE COMPANY, OF CHICAGO, ILLINOIS, A CORPORATION OF ILLINOIS.

COMBINATION HOT-AIR AND GAS ENGINE.

SPECIFICATION forming part of Letters Patent No. 714,353, dated November 25, 1902.

Application filed December 18, 1901. Serial No. 86,433. (No model.)

*To all whom it may concern:*

Be it known that we, CHARLES A. ANDERSON, ERICK A. ERICKSON, and JOHN WICKSTROM, citizens of the United States, and residents of Chicago, in the county of Cook and State of Illinois, have invented certain new and useful Improvements in Combination Hot-Air and Gas Engines, of which the following is a specification.

This invention relates to improvements in combination hot-air and gas engines; and it consists in certain novel features of construction and arrangements of parts, as will be hereinafter more fully set forth, and particularly defined in the claims.

The principal objects of our invention are, first, to provide an engine capable of being operated either by heated air alone or by a combustible mixture of air and an inflammable gas or vapor; second, to provide improved means for the mixing of the air and gas or vapor in fixed proportions and in such a manner that the heat from the combustion shall not overheat the power-piston or impair its working efficiency; third, to provide an engine in which the heat resulting from the combustion shall be converted into mechanical energy in the most efficient and economical manner. We attain these objects by the mechanism illustrated in the accompanying drawings, in which—

Figure 1 is a vertical sectional view of an engine embodying our improvements, showing the relative positions occupied by the pistons when drawing in a charge of air and gas. Fig. 2 is an enlarged detail view of the heater part constituting the inclosing wall or shell of the combustion-chamber, showing its corrugated outer surface. Fig. 3 is a central vertical sectional view similar to Fig. 1, but showing the relative positions occupied by the pistons at about the beginning of their outward or working stroke. Fig. 4 is a top plan view, partly in horizontal section, illustrating the arrangement of the fuel-supply to the burner and cylinder. Fig. 5 is a detail end elevational view, partly in vertical section, on the lines 1 and 2 of Fig. 4 looking in the direction of the arrows, the upper sectional part of said view showing the fuel-vaporizing passage in the body of the exhaust-chamber and the lower sectional part showing the fuel-supply valve for the cylinder. Fig. 6 is an enlarged detail view, partly in central vertical section and partly in elevation, of the transfer-piston and its longitudinal extension in the nature of a trunk-piston. Fig. 7 is a detail view, partly in vertical section on the line 1 and partly in end elevation, of the transfer and trunk-pistons shown in Fig. 6; and Fig. 8 is a view similar to Fig. 7 on the line 2 of Fig. 6 and viewing the transfer-piston from the opposite end.

Similar letters of reference refer to similar parts throughout the several views.

A designates a cylinder having secured to one of its ends a heater part A', constituting, in effect, a longitudinal extension thereof, while its other end is rigidly secured to the main engine-frame, (designated by B.) Arranged to work within the cylinder A is a hollow power-piston E, which by means of pitman E' is connected to the crank F on main drive-shaft F'. This latter is journaled in the engine-frame and carries at one of its ends the usual balance or fly wheel C.

H indicates a cylindrical aperture extending lengthwise and centrally through the power-piston E. The inward portion of the said aperture is of an enlarged diameter, forming a cylinder H'.

G designates a transfer-piston, also arranged to work within the cylinder A and disposed in advance or inwardly of the power-piston. This transfer-piston is provided with a coaxial reduced extension, forming a trunk-piston G', which extends in an outward direction from the transfer-piston and is adapted to reciprocate within the cylinder H'. Secured in the outer end of the trunk-piston G' is a rod g, which extends out through the aperture H and is connected to the crank F on the main drive-shaft F' by means of a link J and a guide-shoe J', working within a hollow guide I, secured in frame B in such a position as to be axially coincident with the extended axis of the cylinder A. Leakage of gas or vapor around the rod g is prevented by means of a stuffing-box h, formed in the end of piston E and surrounding the rod g.

Referring to the particular structure and character of the transfer-piston G, which is best illustrated in Figs. 6, 7, and 8, it will be observed that the outward end portion of this piston is formed of such a diameter as to cause it to fit the walls of the cylinder A closely, this snug-fitting portion of the piston being provided with a circumferential groove $f$ to receive and contain a ring $f'$, which fits the groove loosely, but has a close sliding contact with the inner walls of the cylinder. It will be observed that the inner side or wall of the groove $f$ is provided with a series of notches $f'''$, which notches connect, respectively, with a corresponding series of grooves $e'$, running lengthwise on that portion of the enlarged part of the piston which lies inwardly of the ring or annulus $f'$. The opposite or outer portion of the enlarged part of the piston is provided with a series of grooves $e$, likewise running lengthwise thereon, similar to the grooves $e'$. The remaining portion of the transfer-piston $g$, which lies inwardly of the enlarged portion just described, is of a diameter somewhat smaller than the internal diameter of the cylinder A, thus forming between the outer surface of the piston and the inner wall of the cylinder a narrow annular space, (designated by $a$.) The transfer-piston G is equipped at its inner end with a deflector-plate K, secured thereto in such a manner as to leave a narrow flat space K' between itself and the end wall of the transfer-piston. A fuel-conduit $k$ extends lengthwise and preferably axially entirely through the transfer-piston G and its extended trunk-piston G' and forms a communication between the interior of the cylinder H' and the narrow space K'. Interposed in the fuel duct or conduit $k$ at any suitable point therein, preferably the outer end of the trunk-piston, is a check-valve $k'$, which will allow air or gas to flow in an inward direction, but checks any such flow outwardly. N designates a port formed laterally through the body of piston E and communicating at its inner end with the outer end of the cylinder H', carried and contained by the piston E. This port N at proper intervals in the operation of the engine registers with the fuel-supply port N' in the wall of the cylinder A, as best shown in Fig. 4. M designates another port formed laterally through the wall of the cylinder A for the intake of air.

Referring to Figs. 1, 2, and 3, it will be observed that the heater part A', constituting the shell or casing of the combustion-chamber, is provided on its outside with a series of ribs or corrugations V, the purpose and design of which is to prevent the oxidized metal which forms on the surface of this part from falling off, and thus exposing new portions thereof to the oxidizing influence of heat and air. Where a heater part having a smooth outer surface is employed, the oxidizing influences to which it is subjected cause the material thereof to crack, peel, and fall therefrom, thus rapidly deteriorating and wearing away the walls of the device. With our improved roughened or corrugated surface of heater part we successfully counteract this influence. Surrounding the heater part A' is a fire-box T, which is lined with fire-clay T' or some other refractory material capable of withstanding great heat.

L designates a burner, preferably of the ordinary Bunsen type, the function of which is to initially heat up the walls of the combustion-chamber (represented by the heater part A') when the engine is to operate as an internal-combustion motor and to maintain the same part constantly heated when the engine is to be used as a hot-air motor. At L' is shown a chimney or vent for the escape into the atmosphere of the burned products from the burner L.

Secured to the cylinder A and communicating with its interior is an exhaust-valve chamber P, which is provided with a valve P', operated in properly-timed relation from the drive-shaft F' by means of eccentric O, eccentric-rod O', and an intermediate tappet $o$. This tappet $o$, as herein shown, consists simply of a short laterally-extending arm secured on the end of the eccentric-rod O' by means of a nut $o'$, Fig. 3, and having its outer or free end transversely bored to slide over the stem of the exhaust-valve and on its advance movement abut a collar $p$, fast on the valve-stem.

R designates a conduit cored in the body of the exhaust-valve chamber P, the purpose of which is to vaporize the oil-fuel and at the same time prevent the valve-chamber and valve from overheating. This feature of construction is most clearly shown in Fig. 5.

R', Fig. 4, designates the fuel-supply pipe connected at $r$ to the conduit R, above described. Leading from the opposite end of the conduit R is a pipe $r'$, serving to conduct the fuel to the burner L, whence the fuel passes past a fuel-regulating valve S' into and through another pipe S, which serves to convey the fuel to the supply-port N' in the cylinder A.

The operation of our engine when used as an internal-combustion motor is as follows: The burner L having been heated in any ordinary manner to a temperature sufficiently high to generate a vapor from the oil-fuel, its valve is opened and the burner ignited. The flame is directed upon and strikes the inner end of the heater part A', being deflected thence around its sides in the space between the same and the refractory lining T', the products of combustion passing therefrom out into the atmosphere through the vent L'. When the heater part A' has thus attained the required temperature, the fuel-admission valve S' is opened, and the fly-wheel C is given an initial revolution, whereby the transfer-piston G and the power-piston E will recede from each other, drawing in air into the space formed between them and fuel gas or vapor into the cylinder H' behind the trunk-piston G'. The pistons having during their opposite or separating travel thus drawn in the required amount of air and vapor, the transfer-piston on account of its manner of connection to the crank F will remain substantially stationary at the end of its instroke, while the power-piston by reason of its manner of connection to the crank F will travel rapidly inward toward and behind the transfer-piston, thereby compressing the air and the fuel gas or vapor in the comparatively cool parts of the engine. At about the completion of the instroke of the power-piston the transfer-piston commences its outstroke and by traveling toward the power-piston transfers the air and fuel gas or vapor to the combustion-chamber lying within the heater part A', the air taking its course through the grooves $e$, forcing the ring $f'$ to its inner seat in the groove $f$ against the notched wall of said groove, thereby passing around said ring and continuing its inward travel through the notches $f''$ and grooves $e'$, and thence through the annular space $a$ around the transfer-piston, whereby its temperature is raised by the absorption of heat from the metallic walls of the cylinder and the transfer-piston. The gas or vapor is simultaneously caused to flow inward past the check-valve $k'$ through conduit $k$, whence it impinges upon the inner face of the plate K and is thereby deflected radially outward through the space or passage K', meeting the incoming current of air at about right angles thereto, thus forming a thorough intermixture with the air and providing a perfect combustible mixture, which by direct contact with the heated walls of the heater part A' automatically ignites, causing intense heat and a corresponding increase of volume and pressure. The pistons by means of their relative connection to the crank F are caused to travel at a practically uniform speed during the greater part of their outstroke, thereby allowing the hot gases of combustion to expand within the heater part A', producing a high and prolonged effective pressure, which is transmitted to the main shaft and fly-wheel through the connection shown, while at the same time that comparatively remote part of the cylinder A within which the power-piston travels is prevented from becoming overheated, thereby obviating the necessity of water-jacketed parts. The pistons having almost completed their outstroke, the exhaust-valve E' is opened by the actuating devices described and shown, thereby permitting the products of combustion under such pressure as may remain to them to escape into the atmosphere. The exhaust-valve is kept open during that part of the revolution of the main shaft in which the transfer-piston makes its instroke, expelling the remaining burned gases into the atmosphere. The engine having thus received its first power stroke, the momentum of the fly-wheel will cause the next intake, compression, and transfer of the air and fuel, which will be followed by the second power impulse, and the above-described cycle of operations will be repeated, it being noted that the engine performs one working stroke during each complete revolution of the main shaft.

To operate the engine as a hot-air motor, it is necessary only to cut off the supply of fuel by closing the valve S' and maintain the heater part A' constantly hot by the external application thereto of heat through the burner L. It is also to be noted that the engine while working is taking in its supply of air at or near that end of the cylinder remote from the combustion-chamber and compressing it in a comparatively cool portion of the cylinder and that a preliminary heating is given thereto before forming the combustible charge, thereby raising the initial temperature of combustion, and after expanding a large portion of the remaining specific heat of the gases of combustion is stored up in the metallic walls of the cylinder and the transfer-piston, which heat serves to heat the incoming air, as above explained.

Our invention is not limited to the specific form and exact relative arrangement of cooperating parts as herein shown and described, since it is obvious that the same might be considerably varied within the spirit and operative principle of our invention.

What we claim as our invention, and desire to protect by Letters Patent, is—

1. In an engine, the combination of a power-cylinder having a heater at one end thereof, and having a port for the intake of air and a separate port for the intake of a combustible fluid, power and transfer pistons in said cylinder, and means to cause said pistons to alternately approach and recede from each other, substantially as and for the purposes set forth.

2. In an engine, the combination of a cylinder having a heater at one of its ends, a power and a transfer piston in said cylinder, means to admit atmospheric air and a combustible fluid in separate compartments between said pistons, means to compress the air and the combustible fluid in the cool end of said cylinder, and separate conduits for the transferring of the air and the combustible fluid from the cool to the heated part of the cylinder, substantially as and for the purposes set forth.

3. In an engine, the combination of a working cylinder having a combustion-chamber at one end thereof, a power-piston containing within itself a fuel-compression cylinder, a transfer-piston having a trunk extension, which latter is arranged to slide within said fuel-compression cylinder, means for admitting air between the said pistons and for admitting fuel to the fuel-compression cylinder, and separate conduits connecting the space between the pistons and the fuel-compression cylinder respectively with the combustion-chamber, substantially as and for the purposes set forth.

4. In an engine, the combination of a cylinder having a power and a transfer piston, means for the intake of air and a combustible fluid in separate compartments between said pistons, and means to heat said air and combustible fluid before the forming of a combustible mixture, substantially as and for the purposes set forth.

5. In an engine, the combination of a working cylinder, power and transfer pistons disposed in longitudinal alinement therein, a fuel-compression cylinder formed within one of said pistons, a trunk-piston constituting an extension of the meeting face of the other piston and operating in said fuel-compression cylinder, means for admitting fuel to said fuel-compression cylinder and a fuel-duct formed through the other piston and its extension and leading to the combustion end of the working cylinder, substantially as and for the purposes set forth.

6. In an engine, the combination of a working cylinder, power and transfer pistons disposed in longitudinal alinement therein, a fuel-compression cylinder formed within the power-piston, a trunk-piston constituting an extension of the meeting face of the transfer-piston and operating in said fuel-compression cylinder, means for admitting fuel to said fuel-compression cylinder, means for admitting air to the space between said pistons, a valve-controlled fuel-duct formed through the transfer-piston and its extension and leading to the combustion end of the working cylinder, and a valve-controlled air-conduit connecting the space between the pistons with the combustion end of the working cylinder, substantially as and for the purposes set forth.

7. In an engine, the combination of a working cylinder having formed through its walls air and fuel inlet apertures adapted to be overrun by the power-piston, power and transfer pistons disposed in said cylinder adjacent the outer and inner ends thereof, respectively, a fuel-compression cylinder formed within the power-piston and provided with a lateral duct leading to the outer cylindrical surface of the power-piston adapted to be brought into register with the fuel-aperture of the working cylinder, a trunk-piston constituting an extension of the meeting face of the transfer-piston and operating in said fuel-compression cylinder, a valve-controlled fuel-duct formed through the transfer-piston and its extension, and leading to the combustion end of the working cylinder, and a valve-controlled air-conduit connecting the space between the pistons with the combustion end of the working cylinder, substantially as and for the purposes set forth.

8. In an engine, the combination of a working cylinder, a piston therein, a fuel-duct formed longitudinally through said piston, an annular air-conduit between the outer cylindrical surface of said piston and the inner cylindrical surface of the cylinder, a deflector-plate secured to the inner face of the piston and providing between itself and the latter a radially-disposed termination of the fuel-duct which meets the air-conduit at right angles all around the piston, and means for forcing air and fuel separately through their respective passage-ways, substantially as and for the purposes set forth.

9. In an engine, the combination of a working cylinder, power and transfer pistons therein, a fuel-duct formed longitudinally through said transfer-piston, an annular air-conduit between the outer cylindrical surface of said transfer-piston and the inner cylindrical surface of the cylinder, a deflector-plate secured to the inner face of the transfer-piston and providing between itself and the latter a radially-disposed termination of the fuel-duct which meets the air-conduit at right angles all around the piston, an intake for air between said pistons, and a fuel-compressor also operated by the relative movements of said pistons, whereby the air and fuel are forced separately through their respective passage-ways, substantially as and for the purposes set forth.

10. In a combined internal-combustion and hot-air engine, the combination of a cylinder, a heater part secured to one end and forming an extension of said cylinder, said heater part forming the shell or casing of the combustion-chamber, power and transfer pistons within said cylinder, means for separately inducing and compressing air and fuel between said pistons, a burner adapted to heat said heater part, and a cut-off valve controlling the admission of air to the cylinder, substantially as and for the purposes set forth.

In testimony that we claim the foregoing as our invention we have signed our names to this specification in the presence of two subscribing witnesses.

CHARLES A. ANDERSON.
  ERICK A. ERICKSON.
  JOHN WICKSTROM.

Witnesses:
 SAMUEL N. POND,
 FREDERICK C. GOODWIN.